United States Patent [19]

Regen et al.

[11] Patent Number: 5,239,578
[45] Date of Patent: Aug. 24, 1993

[54] NOISE CANCELLING APPARATUS FOR A TELEPHONE HANDSET

[75] Inventors: Paul L. Regen, Felton; William H. Kingsley, II, Santa Cruz, both of Calif.

[73] Assignee: Plantronics, Inc., Santa Cruz, Calif.

[21] Appl. No.: 523,590

[22] Filed: May 15, 1990

[51] Int. Cl.$^5$ .............................................. H04M 1/03
[52] U.S. Cl. .................................... 379/387; 379/433; 379/419; 381/91
[58] Field of Search .............. 379/387, 428, 433, 449, 379/419, 390; 381/88, 91, 92, 94, 122

[56] References Cited

U.S. PATENT DOCUMENTS

| | | | |
|---|---|---|---|
| 3,004,103 | 10/1961 | Hart | 381/91 |
| 3,830,988 | 8/1974 | Mol et al. | 379/419 |
| 4,672,666 | 6/1987 | Kuhfus | 379/428 X |
| 4,752,961 | 6/1988 | Kahn | 379/387 X |
| 4,773,091 | 7/1988 | Busche et al. | 379/433 |
| 4,776,009 | 10/1988 | Gumb et al. | 379/433 |
| 4,803,724 | 2/1989 | Utoh et al. | 379/433 |
| 4,847,897 | 7/1989 | Means | 379/390 |
| 4,850,016 | 7/1989 | Groves et al. | 379/433 |
| 4,891,837 | 1/1990 | Walker et al. | 379/390 |
| 4,908,855 | 3/1990 | Ohga et al. | 379/390 X |
| 4,984,268 | 1/1991 | Brown et al. | 379/433 |

Primary Examiner—James L. Dwyer
Assistant Examiner—M. Shehata
Attorney, Agent, or Firm—Arnold, White & Durkee

[57] ABSTRACT

An improved noise cancelling apparatus is disclosed combining a unique directional noise cancelling microphone structure with a noise reducing, signal shaping electronic circuit. The microphone structure simultaneously receives two input signals; a first signal containing only ambient noise and a second signal containing both ambient noise and a voice signal. The microphone structure cancels the two noise components and transmits the voice signal into an electrical signal. The electronic circuit further processes the electrical signal to suppress any noise components not cancelled by the microphone structure. The electronic circuit also functions to enhance the high frequency components of the voice signal to provide a richer, more pleasant sounding output. Because the unique microphone structure is combined with the electronic circuit the noise cancelling apparatus of the present invention provides a cleaner, more pleasant sounding output than that of the prior art.

17 Claims, 5 Drawing Sheets

U.S. Patent     Aug. 24, 1993     Sheet 1 of 5     5,239,578
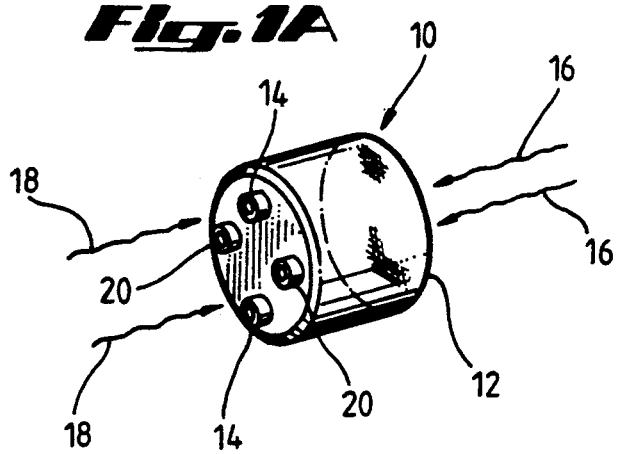
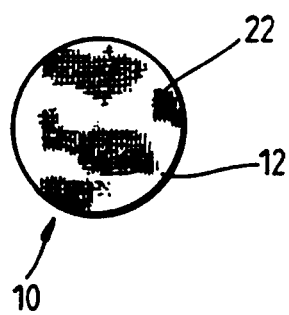
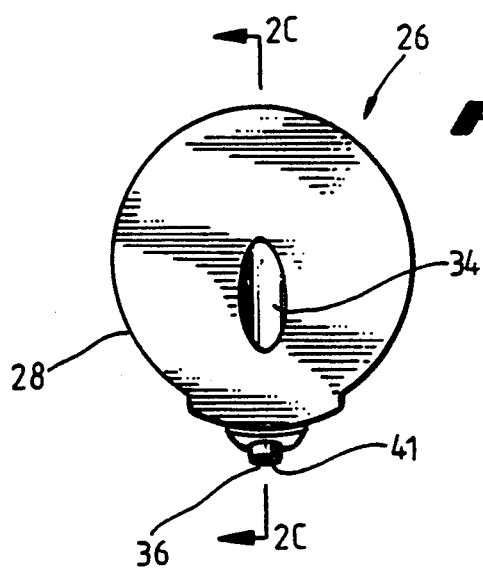
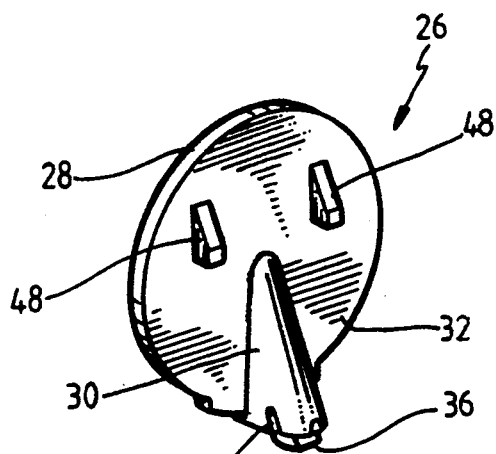
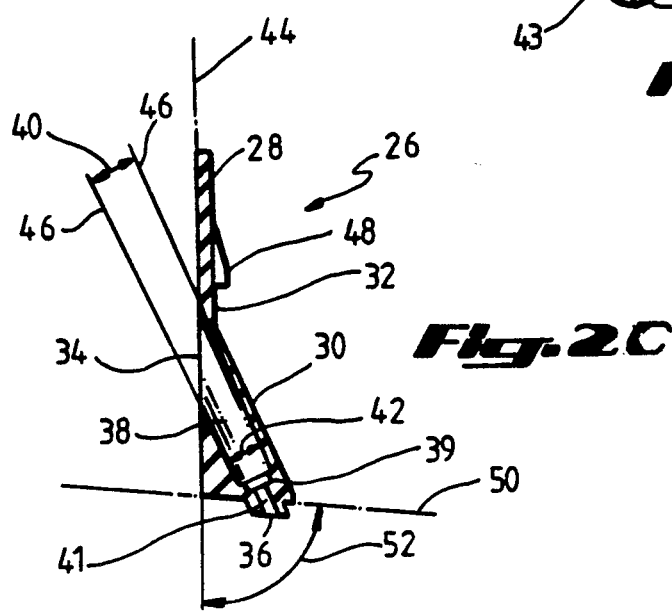

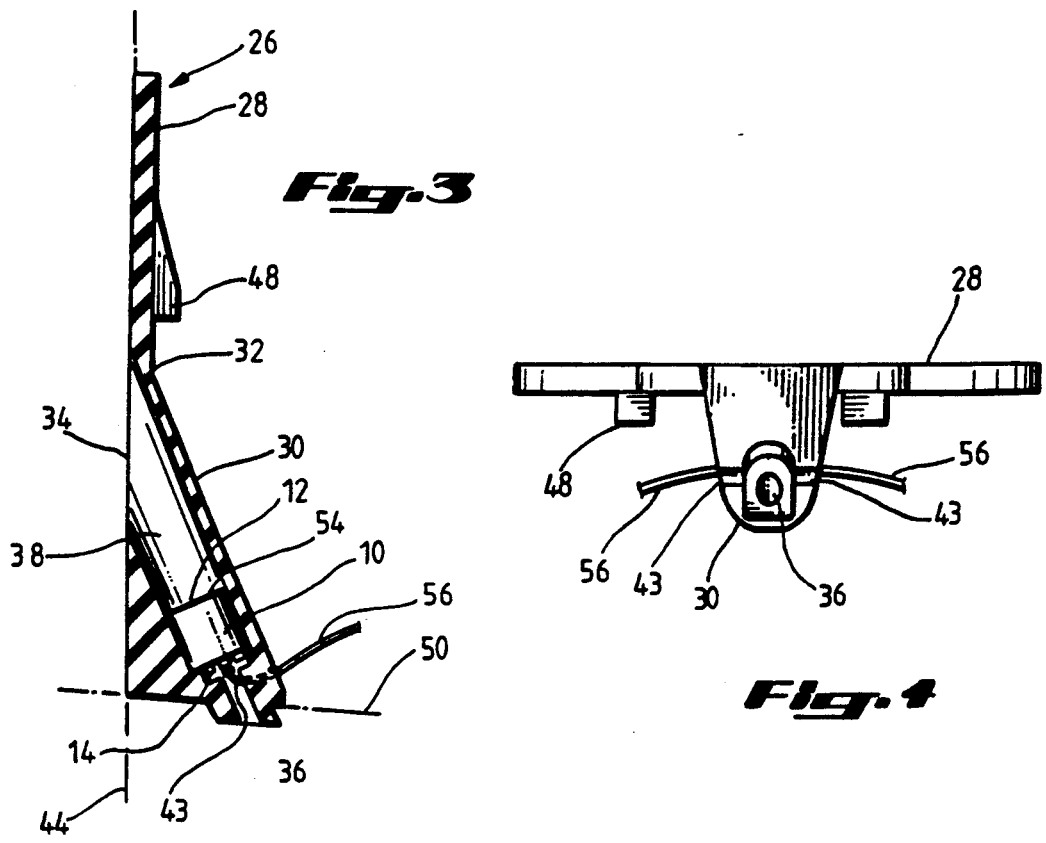
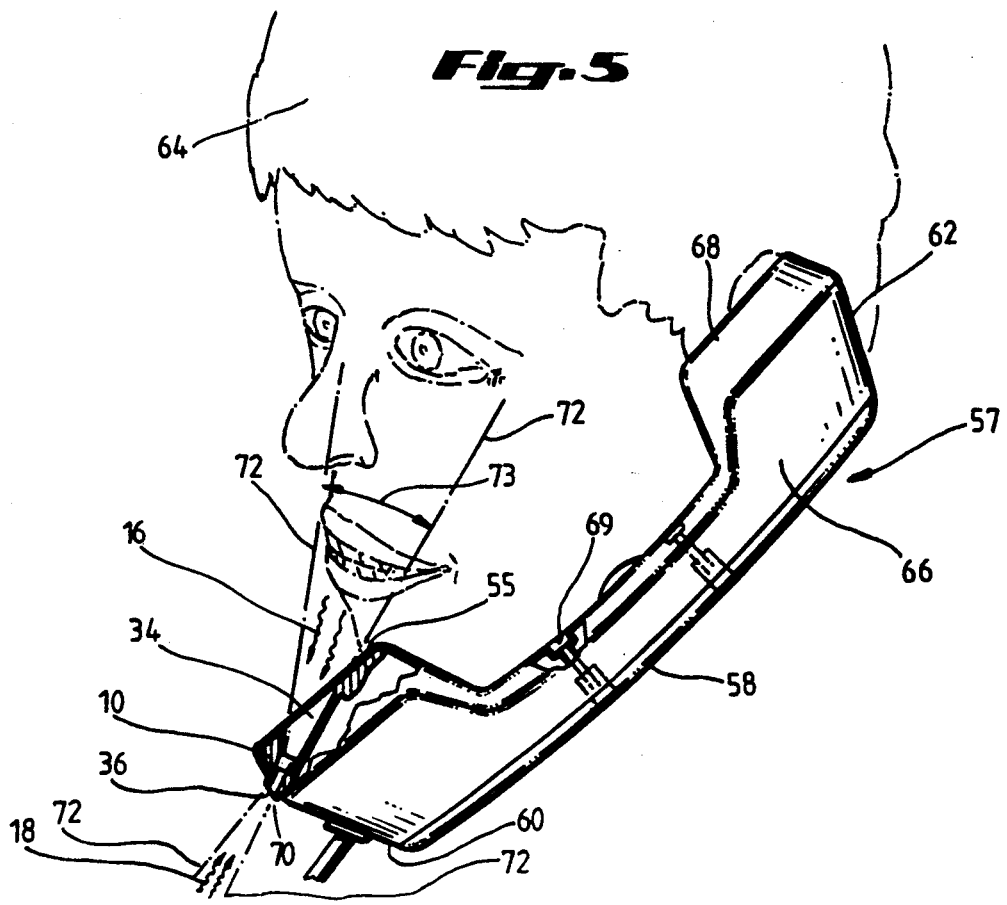

NOISE CANCELLING APPARATUS FOR A TELEPHONE HANDSET

BACKGROUND OF THE INVENTION

1. Field of the Invention

This invention generally relates to a noise cancelling apparatus for use in a telephone handset and, more particularly, to a noise cancelling apparatus that combines a directional, noise-cancelling microphone structure with a noise-reducing, signal-shaping electronic circuit for reducing ambient noise transmitted through the telephone handset.

2. Description of the Related Art

For most communication systems operating under normal conditions, ambient noise does not pose a serious problem. The noise, as well as the voice signal, is conveyed to the listener without any special processing to eliminate the noise signal. However, in an environment, such as a factory, a computer room, or a construction site, where the ambient noise is quite substantial, the noise element must be taken into consideration. If left unfiltered, the high noise level interferes with and distorts the voice signal, as well as fatigues the listener on the receiving end.

Numerous devices for reducing ambient noise transmission have been contemplated. One such device employs an electronic noise guard circuit that receives an input signal and separates it into two components, a rapidly fluctuating signal and a steady signal. The fluctuating signal is assumed to be the voice signal, while the steady signal is considered to be environmental noise. Thus, the noise guard circuit simply removes the steady component from the input signal, leaving only the voice signal.

One inherent drawback of this method is that it indiscriminately eliminates all steady signals. If the steady component contains not only noise but part of the voice signal as well, then a portion of the voice signal is lost.

Another drawback arises from the oversimplified approach that noise manifests itself as only a steady signal. Clearly, if the ambient noise is fluctuating, the circuit does not suppress the noise.

Another device for suppressing ambient noise involves a voice switching system that compares the input signal to a reference voltage. If the input signal is lower than the reference voltage, the system assumes that the input signal contains only noise and, consequently, suppresses the entire signal. Once the input signal rises above the reference voltage, the circuit allows the entire signal to pass. This arrangement prevents the transmission of noise during the idle portions of a conversation; however, it does not eliminate the background noise when the level of the input signal is above the reference voltage. The reference can be set to a higher level to eliminate more background noise, but in a high noise environment, the reference would have to be set at such a high level that shouting would be necessary.

Some voice switching systems also include a low-pass filter to selectively reduce high frequency noise. These type systems also fail to provide satisfactory results, in that they indiscriminately remove the high-frequency portion of speech, thereby rendering it less understandable.

Yet another device designed to eliminate ambient noise is a directional noise cancelling microphone embodying a diaphragm having at least two ports for receiving audio signals. The diaphragm is designed such that the two noise components of the input audio signals cancel each other, leaving only the voice signal to be transmitted over the telephone handset.

Previous directional noise cancelling microphones suffer from numerous drawbacks, however. They are bulky and cumbersome in design, usually requiring additional components to be attached to the exterior of the telephone handset. Further, the directivity characteristic of these microphones is also poor. In fact, when the position of the microphone deviates slightly from the desired position, the microphone severely distorts the voice of the speaker or even fails to receive the voice signal, resulting in a very undesirable voice cancelling effect. Furthermore, despite the noise cancelling function performed by these microphones, the output signal still contains a substantial noise component.

The present invention is directed to overcoming one or more of the problems set forth above.

SUMMARY OF THE INVENTION

In light of the shortcomings of the prior art, it is an object of the present invention to provide a noise cancelling apparatus that substantially reduces background noise without adversely affecting the transmitted voice signal.

Another object of the present invention is to provide a noise cancelling apparatus that is more tolerant of the mispositioning of the microphone with respect to the input signal source.

Yet another object of the present invention is to provide a noise cancelling apparatus that is compact in design and simple in construction so that it can readily fit within a standard telephone handset without requiring any additional external attachments.

Yet another object of the invention is to provide a noise cancelling apparatus capable of delivering a fuller, more realistic-sounding voice signal.

According to the objects of the invention, a noise cancelling apparatus is provided which combines a unique directional noise cancelling microphone structure with an electronic voice switching, signal shaping circuit (hereinafter referred to as the "electronic circuit"). A pressure gradient noise cancelling microphone is employed by the present invention to receive input audio signals. The uniquely designed boot for housing the microphone take the form of a flat disc having a slanted directional portion protruding from one face of the flat disc. The directional portion of the boot is hollow with an opening at both ends and, within this portion, resides the microphone. Together, the microphone and the boot form a unique microphone structure which is more tolerant of mispositioning of the microphone with respect to the input audio signal source. This tolerance allows the user to move the microphone about more freely without adversely effecting the reception of the input audio signals, quite unlike the directional microphones of the prior art. The unique shape and size of the microphone structure also enables it to readily fit within the transmitting compartment of a standard telephone handset. This directional noise cancelling microphone structure functions to receive audio signals through the openings of the directional portion of the boot, cancel the noise components present in the two audio signals, and transduce the voice signal into an electrical signal. The electrical signal is thereafter sent to the electronic circuit for further processing.

Within the circuit, a low pass filtering means is provided to eliminate from the input signal the high frequency component which is inherently present in the output of the directional microphone structure of the present invention. Afterwards, an amplifying means is provided to amplify the signal to an acceptable level. The amplified signal is then sent to voice switching or expansion means where, depending on the level of the amplified signal, the signal is either passed or attenuated. The expansion means passes strong signals (which are usually voice signals) and attenuates weak signals (which are usually noise signals). The expansion means acts as a second noise cancelling means to eliminate the noise components left unsuppressed by the noise cancelling microphone. After the expansion means, two high frequency boosting means are proved to enhance the high frequency components of the signal to produce a fuller, more realistic-sounding output signal. Overall, the apparatus of the present invention provides an output which is cleaner, richer, and more pleasant sounding than that of the prior art. As a result, the typically stressful task of communicating in a high noise environment is transformed into a much more relaxed and enjoyable experience.

BRIEF DESCRIPTION OF THE DRAWINGS

Other objects and advantages of the invention will become apparent upon reading the following detailed description and upon reference to the drawings in which:

FIGS. 1A-B respectively illustrate a rear and front view of the pressure gradient microphone employed by the invention;

FIGS. 2A-C respectively illustrate a front, rear, and side view of the microphone boot used to house the pressure gradient microphone;

FIGS. 3 is a cross-sectional side view of the microphone and the microphone boot specifically showing the placement of the microphone within the hollow portion of the microphone boot;

FIG. 4 is an end view of the microphone boot specifically showing the holes extending through the slanted portion of the boot for allowing wires to enter the boot to connect the output terminals of the microphone to external circuitry;

FIG. 5 shows the complete microphone structure of the present invention installed within a standard telephone handset and its relationship to an operator of the handset;

Figure 6:
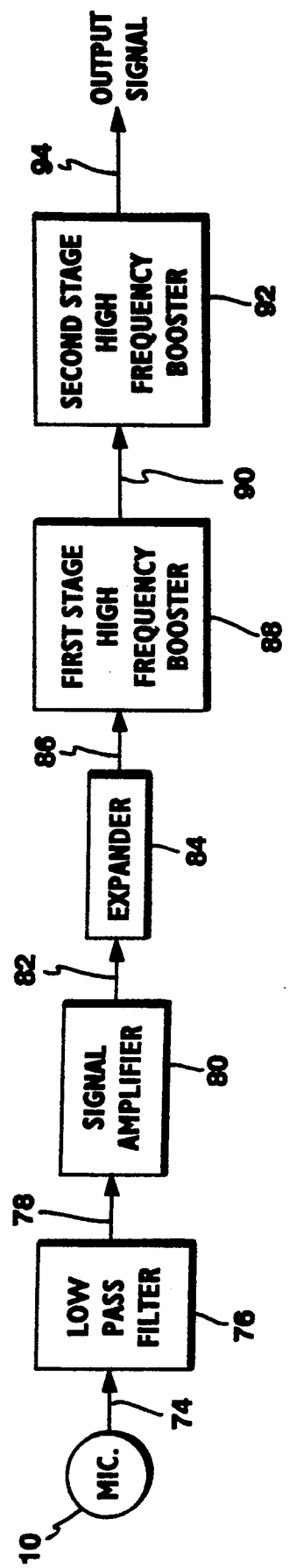
FIG. 6 is a functional block diagram representation of the electronic circuit employed by the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

A preferred embodiment of the present invention comprises a unique noise-cancelling, directional microphone structure and an electronic voice-switching, signal-shaping circuit. With reference to FIGS. 1A-B, a microphone 10 employed by the present invention is preferably a pressure-gradient, noise-cancelling microphone, such as an electret microphone manufactured by Primo Microphone Inc. as model number EM94.

The microphone 10 has a front port 12 and two rear ports 14 for receiving acoustic input signals 16, 18, and two output terminals 20 for delivering an electrical signal representative of the difference in the acoustic input signals 16, 18. The microphone 10 is commercially available and will not be discussed in detail herein except to note that it is a pressure-gradient microphone, where only the pressure difference between the two acoustic input signals 16, 18 is transduced into an electrical signal by an acoustically sensitive membrane (not shown). Therefore, if the front port 12 receives both an acoustic voice signal and acoustic ambient noise while the rear ports 14 receive only ambient noise, the noise components of the separate acoustic input signals cancel, leaving only the acoustic voice signal to be transduced into an electrical signal.

It should be appreciated that the noise cancelling effect is not perfect. Thus, a small portion of the acoustic noise signal is received and transduced by the microphone 10. However, any acoustic noise components not cancelled by the microphone 10 are subsequently processed and filtered by the electronic voice-switching, signal-shaping circuit to provide a relatively noise-free output signal. Operation of this circuit is discussed in detail in conjunction with FIGS. 6 and 7.

FIGS. 2A-C show a front, rear, and side view, respectively, of a unique microphone boot 26 of the present invention. The boot 26 enhances the noise cancelling capability of the microphone 10 by adding significant directivity to the microphone 10. That is, the microphone 10 is located within the boot 26 so that only acoustic signals that are within a limited zone of direction are delivered to the front port 12 of the microphone 10. The majority of the acoustic signals outside this zone are shielded by the boot 26 so that they do not reach the microphone 10.

Similarly, the boot 26 is configured so that ambient acoustic signals are directed to the rear ports 14 of the microphone 10 while the rear ports 14 are substantially shielded from receiving acoustic voice signals from the defined zone of direction.

The microphone boot 26, is preferably composed of a flexible material, such a urethane or the like, and takes the form of a flat, circularly shaped disc 28 having a slanted directional portion 30 protruding from a rear face 32 of the disc 28. The slanted portion 30 has a bore 38 with an opening 34 on a front face 35 of the disc 28 and connecting to a smaller diameter bore 39 with an opening 36 at the opposite end 42 of the slanted portion 30. Thus, each the openings 34, 36 at each end of the bore 38 are adapted to receive acoustic signals within the bore 38.

The bore 38 is conical in configuration, having a gradually decreasing diameter such that a diameter 42 adjacent the opening 36 is smaller in size than a diameter 40 adjacent the opening 34. The conical configuration defines the zone of direction. Dashed lines 46 represent an extension of the bore 38 and are illustrated only as an aid in demonstrating the conical shape of the bore 38 and the zone of direction. The dashed lines 46 are not actually part of the microphone boot 26, but represent that acoustic signals generated within these lines 46 are detected at the front port 12 of the microphone 10. Acoustic signals that are generated outside these lines 46 will generally not be detected at the front port 12 of the microphone 10

The bore 38 within the slanted portion 30, connects to the disc 28 at an angle 52, which is approximately thirty degrees. The significance of the angular mounting is best appreciated in conjunction with the discussion accompanying FIG. 5, below.

Protruding from the rear face 32 of the boot 26 are flaps 48, which do not add to the acoustic qualities of the boot but simply aid in attaching the boot 26, to a standard telephone handset.

Referring now to FIG. 3, the installation of the microphone 10 within the bore 38 of the slanted portion 30 is shown. The microphone 10 is disposed within the bore 3 with the front port 12 of the microphone 10 facing the opening 34 and the rear ports 14 facing the opening 36 such that the microphone 10 is capable of receiving acoustic input signals from both openings 34, 36. The front port 12 of the microphone 10 is generally directed toward a use of the telephone handset, while the rear ports 14 are generally directed away from a user of the telephone handset.

Figure 7:
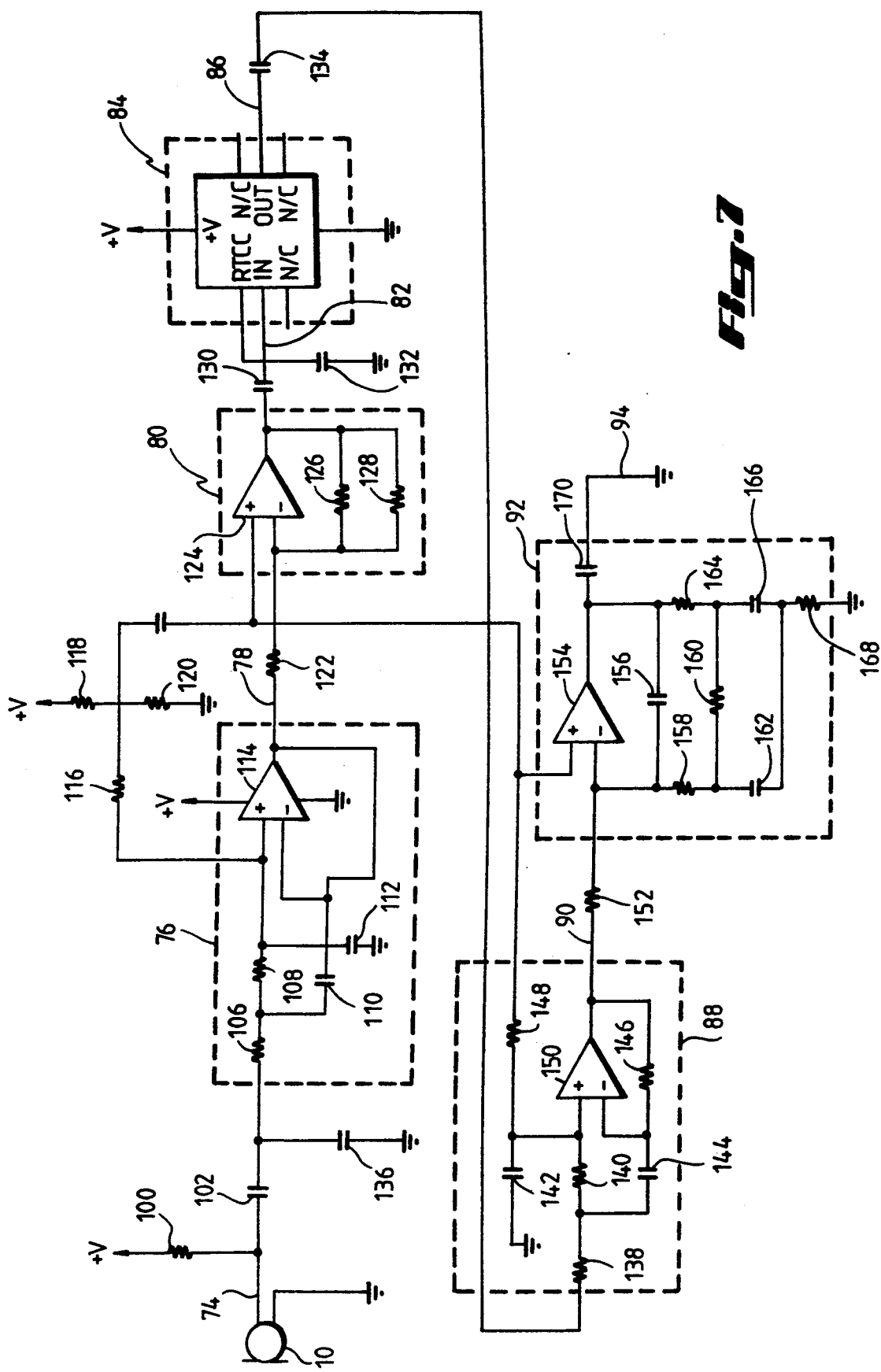
FIG. 7 is a circuit diagram of the electronic circuit employed by the present invention showing one possible implementation of the functional block diagram of FIG. 6.

With reference to FIG. 4, an end view of the boot 26 is provided showing the bore opening 36 relative to a pair of side openings 43 and wires 56 extending therethrough. The side openings 43 extend through the sides of directional portion 30 and the wires 56 extend to connect the output terminals 20 of the microphone 10 (FIGS. 1B and 1C) to the electronic circuit (FIGS. 6 and 7). Together, microphone 10 and boot 26 form a complete microphone structure that employs the dual effect of noise cancelling and directivity. It should be noted that boot 26 is not just for housing microphone 10 but is an integral part of the microphone structure. Boot 26 provides structural support, the front 34 and rear 36 openings for receiving input audio signals, and the shielding necessary for proper operation of the microphone 10. The phrase "microphone structure" is hereinafter used to refer to the boot 26 and the microphone 10 as a single unit.

Due to the slanted directional portion 30 of the boot 26, the microphone structure of the present invention has associated with it a directivity characteristic that enables the microphone 10 to receive input signals only within a limited angular range. This directivity of the microphone structure gives rise to a cardioid shape for its polar plot. In designing a directional noise-cancelling microphone structure, the noise-cancelling capability must be weighed against the sensitivity/mispositioning ratio.

To improve the sensitivity/mispositioning ratio to allow the user to move the microphone structure more freely without adversely affecting the reception of his acoustic voice signal, some noise cancelling capability must be sacrificed and vice versa. Microphone structures having the cardioid shaped polar plots offer the best compromise between the noise-cancelling capability and the sensitivity/mispositioning ratio. Thus, the microphone structure of the present invention is designed to exhibit the cardioid shaped polar plot characteristic. It should be noted, however, that the microphone structure of the present invention is not so limited. It will be appreciated by those skilled in the art that slight modifications may be made to the microphone structure to alter its polar plot characteristics without departing from the spirit and scope of the instant invention.

A by-product of the directivity of the present microphone structure is an enhanced proximity effect. As a general rule, the more directivity that a microphone structure has, the greater the proximity effect. For normal omnidirectional microphones, there is a 6 dB drop in the microphone's output signal strength when the distance between the acoustic signal source and the microphone doubles. That is, a 6 dB drop in signal strength results if an acoustic signal source is moved from, for example, two meters to four meters from the microphone. The directional microphone structure of the present invention provides at least an 8 dB drop in output signal strength for every doubling of distance between the acoustic signal source and the microphone structure.

The proximity effect on signals having a frequency above 1 KHz in negligible. For lower frequency signals, however, the proximity effect is substantial. As a result of the proximity effect, low frequency signals (below 1 KHz) far away from the microphone structure are suppressed while those near the microphone structure are left intact. This is a very desirable effect because low frequencies far away from the microphone are typically background noise while those near the microphone are usually voice signals. In essence, the proximity effect functions to remove low-frequency noise without altering the low-frequency components of the voice signal.

With reference to FIG. 5, the microphone structure 55 of the present invention is shown installed within a standard telephone handset 57 having a transmitter 60 and a receiver 62. The casing of the handset 57 comprises a top and bottom casing section 66, 68 held together by suitable means, such as screws 69. The microphone structure 55 is disposed within the transmitter 60 with opening 34 directed towards the speaker 64 and opening 36 directed away from the speaker 64. Due to the angle of the directional portion 30, the microphone structure 55 only receives acoustic signals within a limited angular range, such as that illustrated by dashed lines 72. The speaker 64 must remain within this angular range 73 to ensure that microphone structure 55 will receive his acoustic voice signals 16.

The top casing section 68 of the handset 57 contains a primary set of holes (not shown) in both the transmitter 60 and receiver 62 through which acoustic signals pass. Acoustic signals 16, which contain both the speaker's voice signal as well as some acoustic ambient noise, pass through the primary set of holes (not shown) in the transmitter 60 and arrive at opening 34 in the microphone structure 55. Acoustic signals 18 pass through an opening 70 within the top casing section 68 to arrive at the opening 36. The microphone 10 respectively receives the two acoustic signals 16 and 18 through front port 12 and back ports 14, cancels the noise components present in both of the acoustic signals, and converts the remaining acoustic signal into an electrical signal. The electrical signal is thereafter transmitted to the electronic circuit for further processing.

Referring to FIG. 6, a functional block diagram representation of the electronic circuit of the present invention is illustrated. The circuit comprises a low-pass filter 76, an amplifier 80, an expander 74, a first stage high-frequency booster 88, and a second stage high-frequency booster 92. An input signal 74, which is derived from the microphone 10, is received by the low-pass filter 76. Due to the design of the microphone structure 55 the input signal 74 inherently has a large peak at 5 KHz. This peak is undesirable for at least two reasons. First, a 5 KHz signal is beyond the frequency range of normal telephone lines so that, even if it were transmitted, it would not be heard by the listener. The second and more important reason is that the 5 KHz peak may adversely affect the functioning of the expander 84. The expander 84 may react to the peak as if it were a voice signal, thereby, passing the input signal whether it contains a voice signal or not. This may result in the transmission of a signal that contains only noise. This is clearly an undesirable result. Therefore, the low-pass filter 76 is employed to provide a roll-off point at approximately 3 KHz because, at this frequency, most of the high frequency components of the voice signal are retained without exceeding the frequency range of typical telephone transmission lines.

The amplifier 80 receives an output signal 78 from the low-pass filter 76 and amplifies the signal to an acceptable level before sending an output signal 82 to the expander 84. The gain of the amplifier 80 is set to a level that depends upon the noise level of the environment in which the noise cancelling apparatus is to be used. Amplifier 8 is described more fully in conjunction with the description of FIG. 7 where one embodiment of the circuit diagram is illustrated.

The expander 84 receives the output signal 82 from the amplifier 80 and, depending on the magnitude of signal 82, either passes the signal or attenuates it. If the input signal 82 is weak, the expander 84 assumes that the input signal 82 contains only noise components and, hence, attenuates it. On the other hand, if the magnitude of the input signal 82 is above a preselected setpoint, the expander 84 assumes that the input signal 82 contains a voice signal and, therefore, passes the input signal 82 at unity gain. The expander 84 acts as a voice switching means to prevent the transmission of signals containing only noise components and to pass those signals that contain voice components. The low-pass filter 76 and the expander 84 combine to provide a secondary noise filtering means to eliminate noise components left unsuppressed by the noise cancelling microphone 10.

The expander 84 of the present invention is preferably a smooth I/O expander, as opposed to a stepped gain expander. A stepped gain expander compares all input signals to a reference level and all signals below this level are attenuated by the same factor, typically 12-18 dB. Signals above the reference level are passed at unity gain. Stepped gain expanders are undesirable because of the sharp transition between the idle and the active portions of a conversation. During the idle portions, the expander detects only background noise; thus, it outputs a highly attenuated version of the input signal. When the speaker actually talks, the expander detects a voice signal and as a result, allows both the voice signal and the background noise to suddenly pass at unity gain. The sudden burst of sound, sometimes referred to as clicking, resulting from the idle to active transition is very annoying to the listener, especially when it occurs every time the speaker talks.

A smooth I/O expander, like a stepped gain expander, compares all input signals to a reference level. If the signal strength is above the reference level, the signal is passed at unity gain. Signals weaker than the reference level are attenuated, but they are attenuated according to signal strength. The weaker the signal, the more it is attenuated. As the input signal increases in magnitude, the attenuation factor decreases until the input signal magnitude reaches the reference level, at which time, the attenuation factor is zero and the input signal is passed at unity gain. Smooth I/O expanders provide a much smoother transition from the idle to the active portions of a conversation, thereby eliminating the annoying clicking evident in stepped gain expanders.

The output signal 86 from the expander 84 is delivered to the first stage high-frequency booster 88 for further processing. The first stage booster 88 behaves as a low-pass filter with a large gain at a frequency of about 3 KHz. For signals have frequency components below 1 KHz, the first stage booster 88 provides a gain of unity. For signals having frequency components between 1 KHz and 3 KHz, the gain derived from the first stage booster 88 gradually rises, peaking at a frequency of approximately 3 KHz. There is a sharp roll-off in gain above 3 KHz to prevent the boosting of the frequencies that were previously suppressed by the low-pass filter 76.

An output signal 90 is delivered from the first stage booster 88 to a second stage booster 92 to amplify the high-frequency components of the signal even further. The second stage booster 92, having a frequency response similar to that or the first stage booster 88, simply completes the task begun by the first stage booster 88.

The boosting of the high frequency components of the signal 86 is desirable for several reasons. First, because the higher frequency components of the signal are responsible for each person's voice being distinct, it is important that these frequency components be enhanced to enable the listener to better distinguish one speaker from another. Second, voice signals are simply more natural and realistic-sounding when they contain a large amount of high-frequency components. Finally, because high-frequency components suffer considerable losses while being transmitted over telephone lines, they must be over-boosted before being transmitted to compensate for the losses that will be incurred during transmission. It is for these reasons that the boosters 88, 92 are incorporated into the electronic circuit of the present invention. After the second stage booster 92, processing of the voice signal is complete and an output signal 94 is transmitted to a telephone network.

A circuit for performing the functions depicted in the block diagram of FIG. 6 is illustrated in FIG. 7. Elements common to both figures are so indicated by identical numbers. With reference to FIG. 7, the microphone 10 delivers the transduced voice signal 74 through capacitor 102 to resistor 106 of the low-pass filter 76. The low-pass filter 76 is a Sallen-Key filter comprising an operational amplifier 114, capacitors 110, 112, and resistors 106, 108. The values of these component 106, 108, 110, 112 are selected such that the filter 76 preferably behaves as a low-pass filter having a roll-off at approximately 3 KHz. Resistors 116, 118, 120, 148 are bias resistors used to divide the power supply voltage to provide the appropriate bias level for the active components of the circuit.

The output signal 78 from the low-pass filter 76 passes through a gain adjust resistor 122 before arriving at the amplifier 80. The amplifier 80 is a feedback amplifier comprising an operational amplifier 124, a capacitor 126, and a resistor 128. By increasing or decreasing the value of the gain adjust resistor 122, the gain of the amplifier 80 is decreased or increased, respectively.

The gain adjust resistor 122, in effect, is used to set the reference voltage of the expander 84. To illustrate, assume that the noise cancelling apparatus is utilized in a very high noise environment so that it is necessary to increase the reference voltage of the expander 84 to account for the high noise level. By selecting a large value for the resistor 122, the gain of the amplifier 80 is decreased, thereby lowering the output signal 82. A lower output signal 82 from the amplifier 80 means that the expander 84 detects a lower input. Because the input signal 8 is lower, the reference level of the expander 84 seems to have been raised. Notice that the actual reference voltage of the expander 84 has not been altered. Only the input signal 82 has been modified to provide the appearance that the reference voltage has been adjusted.

Figure 8:
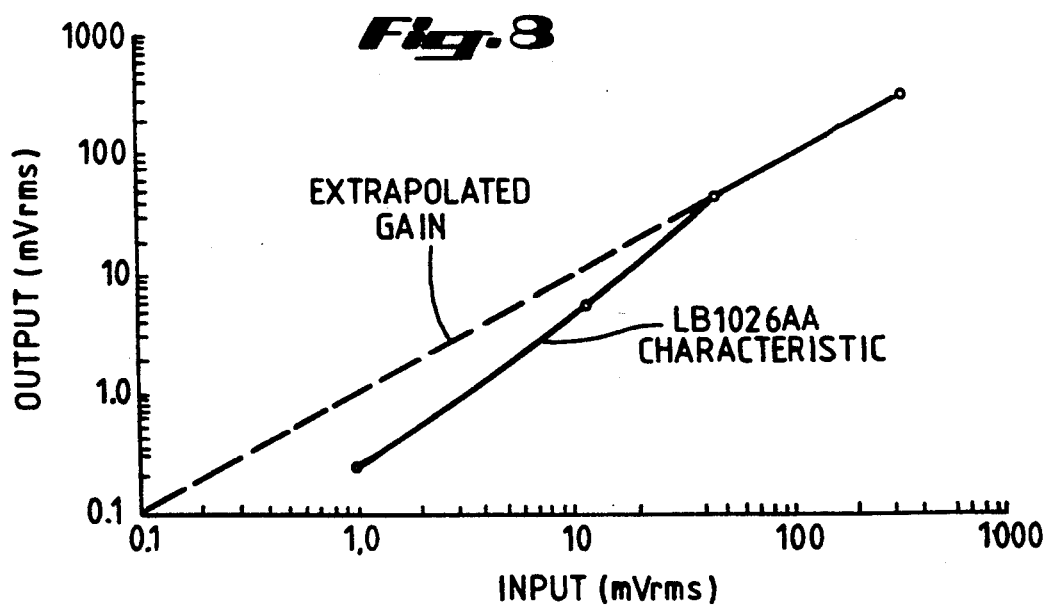
FIG. 8 is a graphical representation of input vs. output voltage of the expander of the present invention, illustrating the smooth transition from the idle portion of the conversation to the active portion.

The expander 84 employed by the present invention is preferably a smooth I/O expander such as model number LB1026AB manufactured by AT&T or an equivalent having the gain characteristic shown in FIG. 8. Referring to FIG. 8, the gain 172 for signals having a voltage greater than reference voltage $V_F$ is unity. Signals below the reference $V_F$ are attenuated according to signal strength such that there is a smooth transition from the idle porion of the conversation (represented by line 174) to the active portion of the conversation (represented by line 176). The clicking experienced in stepped gain expanders is eliminated by the smooth transition of the present expander.

Figure 9:
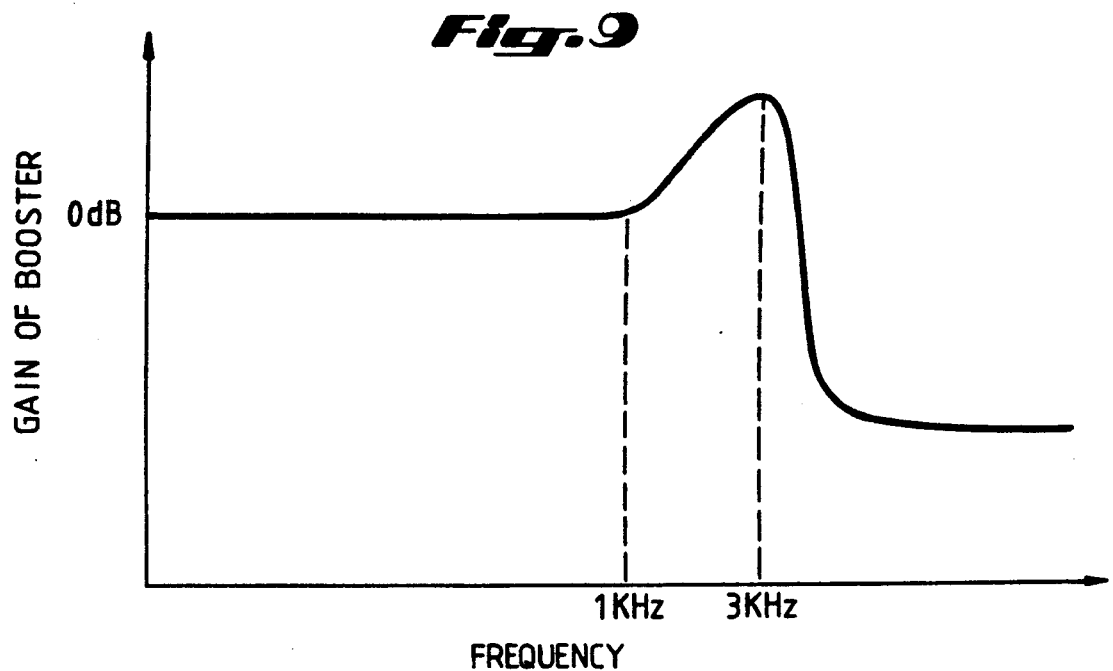
FIG. 9 is a graphical representation of gain vs. frequency for the boosters of the invention, showing the general shape of the gain of the boosters relative to the frequency of the input signal.

Turning once again to FIG. 7, after passing through the expander 84, the input voice signal is passed to the first stage booster 88 for further processing. The first stage booster 88 comprises an operational amplifier 150, resistors 138, 140, 146, and a capacitor 144. The values of these components 138, 140, 144, 146 are selected such that the booster 88 exhibits the frequency response depicted in FIG. 9. With reference to FIG. 9, the booster 88 preferably passes frequencies below 1 KHz at unity gain. Beginning at approximately 1 KHz, the gain of the booster 88 rises as the frequency rises until the gain reaches its peak at about 3 KHz. The value of the gain at 3 KHz is dependent upon the component values selected. After 3 KHz, the gain rolls off sharply to prevent boosting the frequencies that were previously suppressed by the low-pass filter 76. With the frequency response shown in FIG. 9, the first stage booster 88 enhances the high-frequency components of the signal 86 without altering the low-frequency components.

Turning again to FIG. 7, the output 90 from the booster 88 is coupled to the second stage booster 92 through a gain adjust resistor 152. The booster 92 comprises an operational amplifier 154, resistors 158, 160, 164, and capacitors 156, 162, 166. All of the components of the booster 92, except for operational amplifier 154, are part of the complex feedback loop that provides the booster 92 with a frequency response similar to that depicted in FIG. 9. Unlike the booster 88, however, the values of the components 156, 158, 160, 162, 164, 166 need not be changed to alter the gain of the booster 92. Only the value of the resistor 152 needs to be changed to modify the gain. Also, because of the structure of the feedback loop of the booster 92, changing the value of the resistor 152 does not affect the booster's frequency response. Therefore, the booster 92, because of the resistor 152, is capable of providing a Wide range of gain values while retaining the same frequency response.

Depending on how much loss is expected to be incurred during transmission, the gain of the booster 92 is set to a level that compensates for the loss. After boosting the high-frequency components to the desired level, the second stage booster 92 transmits the output signal 94 to the telephone receivers of both the speaker and the listener. Because the voice signal is filtered and processed by the noise-cancelling apparatus before being sent to the speaker's own telephone receiver, the speaker will not hear, in his telephone receiver, the noise present in his own environment. Hence, the annoying sidetone normally experienced by the speaker is eliminated.

Although the noise cancelling apparatus of the present invention has been described with reference to a specific embodiment, it should not be construed to be so limited. It will be clear to those skilled in the art with the benefit of this disclosure, that many modifications can be made without departing from the spirit and scope of the instant invention. Therefore, the invention should not be limited by the illustrative embodiments employed to describe it but only by the scope of the appended claims.

We claim:

1. A noise-cancelling apparatus for generating an electrical signal representative of an acoustic voice signal generated by a user of a telephone handset while reducing the transmission of ambient noise through a transmitter of said telephone handset, comprising:

a microphone having front and rear acoustic ports adapted for receiving first and second acoustic signals respectively and delivering an electrical signal responsive to the difference in said first and second acoustic signals;

a boot positioned within said transmitter and having a bore extending therethrough to form first and second ports generally directed toward the user of the telephone handset and away from the user of the telephone handset respectively, said microphone being positioned within said bore, between said first and second ports, and spaced from said first and second ports, said microphone having its front port positioned in a direction generally directed toward the first port of said boot and its rear port positioned in a direction generally directed toward the second port of said boot;

a low-pass filter adapted for receiving the electrical signal from said microphone, reducing the magnitude of the high-frequency components of said electrical signal above a preselected frequency, and delivering a filtered signal;

expansion means for receiving said filtered signal, comparing the magnitude of said filtered signal to a preselected setpoint, attenuating said filtered signal in response to the magnitude of said filtered signal being less than said preselected setpoint, and passing said filtered signal in response to the magnitude of said filtered signal being greater than said preselected setpoint; and boosting means for receiving the signal from said expansion means, enhancing the magnitude of the high-frequency components of said received signal below said preselected frequency, and delivering the enhanced signal to a receiver of said telephone handset.

2. A noise-cancelling apparatus, as set forth in claim 1, wherein said expansion means attenuates said filtered signal by a factor corresponding to the magnitude of said filtered signal.

3. A noise-cancelling apparatus, as set forth in claim 1, wherein said expansion means attenuates said filtered signal by a factor that increases with decreasing magnitude of said filtered signal.

4. A noise-cancelling apparatus, as set forth in claim 1, wherein said low-pass filter passes signals having frequency content of less than approximately 3 KHz at unity gain.

5. A noise-cancelling apparatus, as set forth in claim 1, wherein said boosting means passes signal in the range of approximately 0–1 KHz at unity gain and amplifies signals above approximately 1 Khz.

6. A noise-cancelling apparatus, as set forth in claim 5, wherein said boosting means passes signals in the range of approximately 0–1 KHz at unity gain, amplifies signal in the range of approximately 1–3 KHz, and attenuates signals above approximately 3 KHz.

7. A noise-cancelling apparatus for generating an electrical signal representative of an acoustic voice signal generated by a user of a telephone handset while reducing the transmission of ambient noise through a transmitter of said telephone handset, comprising:

a microphone having front and rear acoustic ports adapted for receiving first and second acoustic signals respectively and delivering an electrical signal responsive to the difference in said first and second acoustic signals;

directional means for mounting said microphone within the transmitter of said telephone handset with the front port of said microphone being generally directed toward the user of the telephone handset, said directional means substantially shielding the first port of said microphone from receiving ambient acoustic signals originating from outside of a defined zone of direction, said directional means including a boot disposed in the transmitter of said handset and having a bore opening at a first location onto a voice receiving surface of said transmitter adjacent said user and extending into said boot along a longitudinal line generally directed toward the user of said handset, said bore opening at a second location through a sidewall of said handset in a direction generally opposite to the user, and said microphone is disposed in said bore adjacent said second bore opening with said front port facing the voice receiving surface of said transmitter and the rear port facing the sidewall of said handset, said bore being conical in configuration and having a larger diameter at said first bore opening than at said second bore opening, whereby a conical extension of said bore from said first bore opening in a direction toward said user defines said zone of direction;

a low-pass filter adapted for receiving the electrical signal from said microphone, reducing the magnitude of the high-frequency components of said electrical signal above a preselected frequency, and delivering a filtered signal;

expansion means for receiving said filtered signal, comparing the magnitude of said filtered signal to a preselected setpoint, attenuating said filtered signal in response to the magnitude of said filtered signal being less than said preselected setpoint, and passing said filtered signal in response to the magnitude of said filtered signal being greater than said preselected setpoint; and boosting means for receiving the signal from said expansion means, enhancing the magnitude of the high-frequency components of said received signal below said preselected frequency, and delivering the enhanced signal to a receiver of said telephone handset.

8. A noise-cancelling apparatus for generating an electrical signal representative of an acoustic voice signal generated by a user of a telephone handset while reducing the transmission of ambient noise through a transmitter of said telephone handset, comprising:

a microphone having front and rear acoustic ports adapted for receiving first and second acoustic signals respectively and delivering an electrical signal responsive to the difference in said first and second acoustic signals;

a boot disposed in the transmitter of said handset having a bore opening at a first location onto a voice receiving surface of said transmitter adjacent said user and extending into said boot along a longitudinal line generally directed toward the user of said handset, said bore opening at a second location through a sidewall of said handset in a direction generally opposite to the user, said microphone being disposed in said bore adjacent said second bore opening with said front port facing the voice receiving surface of said transmitter and the rear port facing the sidewall of said handset, said boot shielding the front port of said microphone from receiving ambient acoustic signals originating from outside of a zone of direction defined by an extension of the bore from said first bore opening in a direction toward said user, and said boot substantially shielding the rear port of said microphone from receiving acoustic voice signals from said defined zone of direction;

a low-pass filter adapted for receiving the electrical signal from said microphone, reducing the magnitude of the high-frequency components of said electrical signal above a preselected frequency, and delivering a filtered signal;

expansion means for receiving said filtered signal, comparing the magnitude of said filtered signal to a preselected setpoint, attenuating said filtered signal in response to the magnitude of said filtered signal being less than said preselected setpoint, and passing said filtered signal in response to the magnitude of said filtered signal being greater than said preselected setpoint; and boosting means for receiving the signal from said expansion means, enhancing the magnitude of the high-frequency components of said received signal below said preselected frequency, and delivering the enhanced signal to a receiver of said telephone handset.

9. A noise-cancelling apparatus, as set forth in claim 8, wherein said expansion means attenuates said filtered signal by a factor corresponding to the magnitude of said filtered signal.

10. A noise-cancelling apparatus, as set forth in claim 8, wherein said expansion means attenuates said filtered signal by a factor that increases with decreasing magnitude of said filtered signal.

11. A noise-cancelling apparatus, as set forth in claim 8, wherein said low-pass filter passes signals having frequency content of less than approximately 3 Khz at unity gain.

12. A noise-cancelling apparatus, as set forth in claim 8, wherein said boosting means passes signals in the range of approximately 0-1 Khz at unity gain and amplifies signals above approximately 1 Khz.

13. A noise-cancelling apparatus, as set forth in claim 8, wherein said boosting means passes signals in the range of approximately 0-1 Khz at unity gain, amplifies signals in the range of approximately 1-3 Khz, and attenuates signals above approximately 3 Khz.

14. A noise-cancelling apparatus, as set forth in claim 8, wherein said bore is conical in configuration having a larger diameter at said first bore opening than at said second bore opening, whereby a conical extension of said bore from said first bore opening in a direction toward said user defines said zone of direction.

15. A noise-cancelling apparatus for generating an electrical signal representative of an acoustic voice signal generated by a user of a telephone handset while reducing the transmission of ambient noise through a transmitter of said telephone handset, comprising:

a microphone having front and rear acoustic ports adapted for receiving first and second acoustic signals respectively and delivering an electrical signal responsive to the difference in said first and second acoustic signals;

a boot positioned within said transmitter and having a bore extending therethrough to form first and second ports generally directed toward the user of the telephone handset and away from the user of the telephone handset respectively, said microphone being positioned within said bore, between said first and second ports, and spaced from said first and second ports, said microphone having its front port positioned in a direction generally directed toward the first port of said boot and its rear port positioned in a direction generally directed toward the second port of said boot;

a low-pass filter adapted for receiving the electrical signal from said microphone, reducing the magnitude of the high-frequency components of said electrical signal above approximately 3 Khz, and delivering a filtered signal;

expansion means for receiving said filtered signal, comparing the magnitude of said filtered signal to a preselected setpoint, attenuating said filtered signal by a continuously variable factor corresponding to the magnitude of said filtered signal in response to the magnitude of said filtered signal being less than said preselected setpoint, and passing said filtered signal in response to the magnitude of said filtered signal being greater than said preselected setpoint; and boosting means for receiving the signal from said expansion means, enhancing the magnitude of the high-frequency components of said received signal in the range of approximately 1-3 Khz, passing said signal in the range of approximately 0-1 Khz, attenuating said signal above approximately 3 Khz, and delivering an output signal to a receiver of said telephone handset.

16. A noise-cancelling apparatus, as set forth in claim 15, wherein said expansion means attenuates said filtered signal by a factor that increases with decreasing magnitude of said filtered signal.

17. A noise-cancelling apparatus, as set forth in claim 15, wherein said bore is conical in configuration having a larger diameter at said first bore opening than at said second bore opening.

* * * * *

UNITED STATES PATENT AND TRADEMARK OFFICE
CERTIFICATE OF CORRECTION

PATENT NO. : 5,239,578
DATED : August 24, 1993
INVENTOR(S) : Paul L. Regen et al.

It is certified that error appears in the above-indentified patent and that said Letters Patent is hereby corrected as shown below:

Column 11, line 20, "signal" should be -- signals --.

Signed and Sealed this

Twenty-first Day of June, 1994

Attest:

BRUCE LEHMAN

*Attesting Officer*   *Commissioner of Patents and Trademarks*